US012348611B2

(12) United States Patent
Dai et al.

(10) Patent No.: US 12,348,611 B2
(45) Date of Patent: Jul. 1, 2025

(54) METHOD FOR PROCESSING MULTI-SOURCE DATA

(71) Applicant: JINGDONG TECHNOLOGY HOLDING CO., LTD., Beijing (CN)

(72) Inventors: Ziying Dai, Beijing (CN); Tiecheng Wang, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 145 days.

(21) Appl. No.: 18/281,694

(22) PCT Filed: Apr. 2, 2022

(86) PCT No.: PCT/CN2022/085192
§ 371 (c)(1),
(2) Date: Sep. 12, 2023

(87) PCT Pub. No.: WO2022/213957
PCT Pub. Date: Oct. 13, 2022

(65) Prior Publication Data
US 2024/0048360 A1 Feb. 8, 2024

(30) Foreign Application Priority Data
Apr. 6, 2021 (CN) .......................... 202110369324.2

(51) Int. Cl.
*H04L 9/08* (2006.01)
*G06N 20/00* (2019.01)
(Continued)

(52) U.S. Cl.
CPC .......... *H04L 9/0819* (2013.01); *G06N 20/00* (2019.01); *H04L 9/0618* (2013.01); *H04L 9/14* (2013.01);
(Continued)

(58) Field of Classification Search
CPC ....... H04L 9/0819; H04L 9/0618; H04L 9/14; H04L 2209/601; H04L 9/008;
(Continued)

(56) References Cited

U.S. PATENT DOCUMENTS 10,985,913 B2 * 4/2021 Fu .................. H04L 9/0897
2017/0201371 A1 7/2017 Yagisawa
(Continued)

FOREIGN PATENT DOCUMENTS

CN 109241016 A 1/2019
CN 110572253 A 12/2019
(Continued)

OTHER PUBLICATIONS

International Search Report for PCT/CN2022/085192, dated Jun. 29, 2022, 4 pages.

*Primary Examiner* — Michael Won
(74) *Attorney, Agent, or Firm* — Lippes Mathias LLP

(57) ABSTRACT

A method for processing multi-source data includes: generating a private key fragment of the data providing node, as well as an encryption public key and an evaluation public key, in which, other participating nodes include other data providing nodes and a data using node; generating ciphertext data by encrypting local sample data with the encryption public key, and sending the ciphertext data to a coordination node for training a machine learning model; receiving ciphertext model parameters corresponding to model parameters of the machine learning model trained by the coordination node, in which, the ciphertext model parameters are determined by the coordination node based on the evaluation public key and the ciphertext data received; and decrypting the ciphertext model parameters with the private key fragment, and sending a decrypted model parameter fragment to the data using node.

13 Claims, 5 Drawing Sheets

(51) Int. Cl.
  *H04L 9/06*  (2006.01)
  *H04L 9/14*  (2006.01)
  *H04W 12/041*  (2021.01)
  *H04W 12/0433*  (2021.01)

(52) U.S. Cl.
  CPC ..... *H04W 12/041* (2021.01); *H04W 12/0433* (2021.01); *H04L 2209/601* (2013.01)

(58) Field of Classification Search
  CPC ... H04L 9/3093; H04L 9/0822; H04L 9/0861; H04L 9/30; G06N 20/00; H04W 12/041; H04W 12/0433; G06F 21/602
  See application file for complete search history.

(56) References Cited

U.S. PATENT DOCUMENTS

| | | | |
|---|---|---|---|
| 2023/0198752 A1* | 6/2023 | Hamburg | H04L 9/003 380/44 |
| 2025/0086321 A1* | 3/2025 | Eldefrawy | H04L 9/0618 |

FOREIGN PATENT DOCUMENTS

| | | |
|---|---|---|
| CN | 111460478 A | 7/2020 |
| CN | 111898137 A | 11/2020 |
| CN | 112183767 A | 1/2021 |
| CN | 113807537 A | 12/2021 |

\* cited by examiner

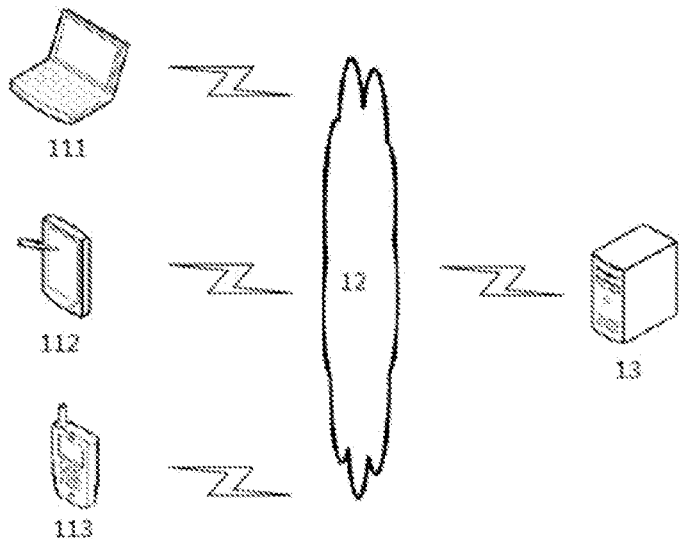

FIG. 1

201 generating a private key fragment of the data providing node, an encryption public key and an evaluation public key, wherein, other participating nodes comprise other data providing nodes and a data using node 202 generating ciphertext data by encrypting local sample data with the encryption public key, and sending the ciphertext data to a coordination node for training a machine learning model 203 receiving ciphertext model parameters corresponding to model parameters of the machine learning model trained by the coordination node, wherein, the ciphertext model parameters are determined by the coordination node based on the evaluation public key and the ciphertext data received 204 decrypting the ciphertext model parameters with the private key fragment, and sending a decrypted model parameter fragment to the data using node

FIG. 2

METHOD FOR PROCESSING MULTI-SOURCE DATA

CROSS-REFERENCE TO RELATED APPLICATIONS

This application is a US national phase application of International Application No. PCT/CN2022/085192, filed on Apr. 2, 2022, which claims priority to Chinese Patent Application No. 202110369324.2, filed on Apr. 6, 2021, the entire contents of which are incorporated herein by reference.

TECHNICAL FIELD

The present disclosure relates to a field of machine learning, and particularly to a method for processing multi-source data, an electronic device and a storage medium.

BACKGROUND

In general, data required by artificial intelligence (AI) relates to a plurality of fields, and the data is often owned by different platforms. In order to establish an efficient machine learning model, it is usually required to obtain a plurality of types of related data from a plurality of platforms. In a scenario of machine learning of multi-source data, security and privacy of data are a core problem.

SUMMARY

A method for processing multi-source data is provided in a first aspect of embodiments of the present disclosure. The method is applicable for a data providing node, and includes: generating a private key fragment of the data providing node, as well as an encryption public key and an evaluation public key, in which, other participating nodes include other data providing nodes and a data using node; generating ciphertext data by encrypting local sample data with the encryption public key, and sending the ciphertext data to a coordination node for training a machine learning model; receiving ciphertext model parameters corresponding to model parameters of the machine learning model trained by the coordination node, in which, the ciphertext model parameters are determined by the coordination node based on the evaluation public key and the ciphertext data received; and decrypting the ciphertext model parameters with the private key fragment, and sending a decrypted model parameter fragment to the data using node.

A method for processing multi-source data is provided in a second aspect of embodiments of the present disclosure. The method is applicable to a data using node, and includes: generating a private key fragment of the data using node, an encryption public key and an evaluation public key, in which, other participating nodes include data providing nodes; receiving ciphertext model parameters corresponding to model parameters of the machine learning model trained by the coordination node, in which, the ciphertext model parameters are determined by the coordination node based on the evaluation public key and the received ciphertext data; acquiring a first model parameter fragment by decrypting the ciphertext model parameters with the private key fragment of the data using node; receiving second model parameter fragments sent by other participating nodes; and acquiring the machine learning model based on the first model parameter fragment and the second model parameter fragments.

A method for processing multi-source data is provided in a third aspect of embodiments of the present disclosure. The method is applicable for a coordination node, and includes: receiving an evaluation public key sent by each of data providing nodes; receiving cyphertext data sent by each of the data providing nodes, in which, the cyphertext data is generated by encrypting sample data of a data providing node with an encryption public key by the data providing node; training a machine learning model by coordinating the data providing nodes, to output model parameters of the machine learning model; obtaining ciphertext model parameters by encrypting the model parameters with the evaluation public key; and sending the ciphertext model parameters to the data providing nodes and a data using node respectively for decryption.

Part of additional aspects and advantages of the present disclosure will be given in the following description, and part will become obvious from the following description, or be understood through the practice of the present disclosure.

BRIEF DESCRIPTION OF THE DRAWINGS

FIG. 1 is a diagram illustrating an application scenario of a method for processing multi-source data provided in the present disclosure;

FIG. 2 is a flowchart illustrating a method for processing multi-source data in an embodiment of the present disclosure;

DETAILED DESCRIPTION

Figure 3:
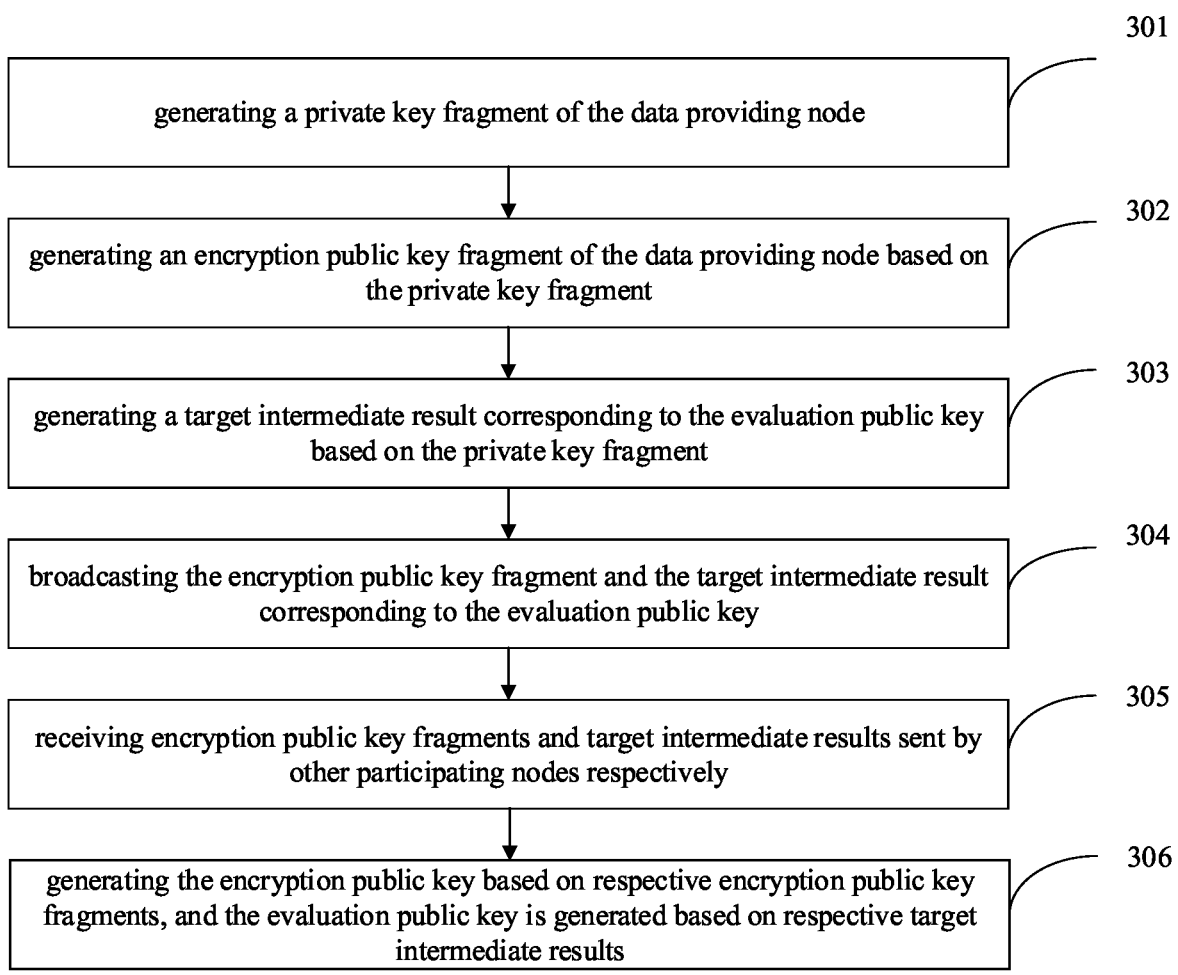
FIG. 3 a flowchart illustrating a method for generating a key in another embodiment of the present disclosure.

The embodiments of the present disclosure are described in detail below. Examples of the embodiments are shown in the accompanying drawing, in which the constant same or similar labels indicate the same or similar components or components with the same or similar functions. The embodiments described below with reference to the accompanying drawings are exemplary, and are intended to explain the disclosure, but should not be understood as a limitation to the disclosure.

For example, FIG. 1 is a diagram illustrating an application scenario of a method for processing multi-source data provided in the present disclosure. As illustrated in FIG. 1, an application scenario may include at least one data providing node (FIG. 1 illustrates two data providing nodes, and one data using node, including a data providing node 111, a data providing node 112 and a data providing end 113, respectively), a network 12, and a coordination node 13.

Each data providing node may communicate with the data using node 13 through the network 12. The data using node 113 may communicate with each data providing node through the network 12, and the data using node 113 may communicate with the coordination node 13 through the network 12. Data providing nodes may communication with each other through the network 12.

It should be noted that FIG. 1 is only a diagram of an application scenario provided in an embodiment of this application, which neither limits the devices included in FIG. 1, nor defines a position relationship between the devices included in FIG. 1. For example, the application scenario illustrated in FIG. 1 may additionally include a data storage device. The data storage device may be an external memory, or an internal memory integrated internally relative to the data providing node, the data using node and the coordination node.

The technical solution in the present disclosure is described in specific embodiments below. It should be noted that, the following several specific embodiments may be combined with each other, and same or similar concepts or processes may not be repeated in some embodiments.

FIG. 2 is a flowchart illustrating a method for processing multi-source data in an embodiment of the present disclosure. As illustrated in FIG. 2, an executive subject is a data providing node. The data providing node may be an E-commerce server, a social server, a communication server or other electronic devices that owns multi-party data of users.

As illustrated in FIG. 2, the method for processing multi-source data includes the following steps S201 to S204.

At S201, a private key fragment of the data providing node, as well as an encryption public key and an evaluation public key are generated.

Other participating nodes include other data providing nodes and a data using node.

More and more machine learning technologies are applied to all walks of life as development of machine learning. Quantity and quality of data often decides an upper limit of an effect of a machine learning model. However, with increasingly strict supervision and increasing attention to data security and privacy protection, isolated data island is formed. In such a scenario, federated learning is emerging, which may cause participating nodes to perform joint training without sharing data, thereby solving the problem of the isolated data island. However, in a cooperation scenario that the federated learning is constructed across departments or across agencies, each party wishes to construct a model by means of common samples of multiple parties and feature sets different from other parties on the premise of not leaking privacy of users.

In embodiments of the present disclosure, the private key fragment of the data providing node, the encryption public key and the evaluation public key are generated by interactive cooperation between the data providing node and other data participating nodes. In some implementations, the data providing node may acquire its own key generation parameters. The key generation parameters include a public parameter and a public random number. Further, the data providing node generates the private key fragment of the data providing node, as well as an encryption public key fragment and a part of the evaluation public key based on the key generation parameters, and interacts with other participating nodes to share the encryption public key fragment of the data providing node and a part of the evaluation public key to other participating nodes. Correspondingly, each of other participating nodes may also share the encryption public key fragment of the participating node and a part of the evaluation public key. The data providing node may acquire the encryption public key after acquiring the encryption public key fragments of other participating nodes, and similarly acquire the evaluation public key based on parts of the evaluation public key acquired. Other participating nodes include other data providing nodes and the data using node. Other data providing nodes may be servers of the same type as the data providing node as the executive subject, or may be other type of servers. Other data providing nodes provide sample data with different dimensions from the data providing node.

At S202, ciphertext data are generated by encrypting local sample data with an encryption public key, and sent to a coordination node for training a machine learning model.

When a plurality of data providing nodes are required to provide data simultaneously, in order to prevent the data of the data providing node from being leaked or stolen, in embodiments of the present disclosure, the data providing node is required to encrypt local data with the encryption public key, and generate one piece of ciphertext data. The data providing node may send the ciphertext data to the coordination node after generating the ciphertext data. The sample data is encrypted with the encryption public key, so that the data providing node knows its own sample data, and other data providing nodes and the coordination node of the machine learning model may not acquire actual contents of the sample data in an entire process of machine learning for multi-source data. Therefore, sample data of each data providing node has higher security, and data leakage may be avoided.

Correspondingly, the coordination node may receive respective pieces of ciphertext data sent by a plurality of data providing nodes. Further, in order to acquire the machine learning model, the coordination node may train the machine learning mode based on the pieces of ciphertext data after acquiring the pieces of ciphertext data.

Continuing taking the scenario of FIG. 1 as an example, a data providing node 111 encrypts local sample data u1 with the encryption public key to generate ciphertext data ct1, and a data provider node 112 encrypts local sample data u2 with the encryption public key to generate ciphertext data ct2. A coordination node 13 may receive ciphertext data sent by each data providing node.

At S203, ciphertext model parameters corresponding to model parameters of the machine learning model trained by the coordination node are received. The ciphertext model parameters are determined by the coordination node based on the evaluation public key and the ciphertext data received.

The coordination node processes each piece of ciphertext data by means of a homomorphic encryption algorithm after receiving the ciphertext data sent by each data providing node, and trains and tests the machine learning model based on processed ciphertext data, to obtain a ciphertext model. Further, the coordination node generates the ciphertext model parameters by performing an encryption calculation on model parameters of the ciphertext model based on the evaluation public key, and sends the ciphertext model parameters to the data providing nodes and the data using node respectively.

Correspondingly, the data providing node may receive the ciphertext model parameters sent by the coordination node.

At S204, ciphertext model parameters are decrypted with the private key fragment, and a decrypted model parameter fragment is sent to the data using node.

In order to ensure data security of each data providing node, each data providing node owns a part of the private key, that is, one piece of private key fragment, but cannot directly acquire a complete private key. The data providing node may decrypt the ciphertext model parameters with its own private key fragment after receiving the ciphertext model parameters. Since complete model parameters may not be obtained by decrypting with the private key fragment, in embodiments of the present disclosure, one piece of model parameter fragment is obtained by decrypting the ciphertext model parameters.

In a scenario of machine learning for multi-source data, the model parameters of the machine learning model are often obtained by the data using node. In embodiments of the present disclosure, the data providing node may send a decrypted model parameter fragment to the data using node in case of being authorized, and the data using node may recover model parameters based on a secret sharing principle after acquiring enough model parameter fragments, further to acquire a trained machine learning model.

According to the method for processing multi-source data provided in embodiments of the present disclosure, with constructing a multi-party threshold homomorphic encryption mechanism, a purpose of performing homomorphic encryption on encrypted data of a plurality of data providing nodes may be achieved. Not only application scenarios of the homomorphic encryption are expanded, but also encrypted data may be further encrypted based on the evaluation public key in a coordination stage, which ensures security of training of a federated learning model better. Since a threshold homomorphic encryption technology is adopted, in a process of training the model by simultaneously acquiring data from a plurality of data sources, security of data and security of model training may be ensured. And on the basis of breaking isolated data island, the plurality of data sources may be simultaneously trained, to obtain the machine learning model with a better performance. And the data is transmitted based on a homomorphic encryption algorithm, which not only may protect security of sample data of the data providing nodes, to prevent information leakage of data providers, but also may ensure security of the model parameters of the model training.

On the basis of the above embodiments, in order to achieve encryption and decryption of the data, before the ciphertext data are generated by encrypting local data with the encryption public key, an interactive cooperation between the data providing nodes and the data using node is further required to generate a key. The key includes a public key and a private key. In embodiments of the present disclosure, the public key for encryption includes an encryption public key and an evaluation public key. In embodiments of the present disclosure, a leveled homomorphic encryption (BGV) algorithm based on learning with errors (LWE) is adopted. It should be noted that, a symbol E.PubKeygen(s; A) represents an encryption public key generation algorithm performed based on a fixed coefficient A. A symbol E.PubKeygen(s; A; e) represents an encryption public key generation algorithm performed based on the fixed coefficient A and noise e.

A process of generating a key is introduced below.

FIG. 3 a flowchart illustrating a method for generating a key in another embodiment of the present disclosure. As illustrated in FIG. 3, an executive subject is a data providing node. The process of generating the key includes the following steps S301 to S306.

At S301, a private key fragment of the data providing node is generated. Each data providing node owns key generation parameters for generating the key, and generates the key based on the key generation parameters. The key generation parameters include a public parameter and a public random number. The public parameter is that params=({params$_d$=($1^\kappa$, $q_d$, m, n, $\varphi$, $\chi$)}$_{0 \leq d \leq D}$, $B_\varphi$, $B_\chi$, $B_{eval}$, $B_{enc}$, $B_{dec}$), where params$_d$ denotes a parameter of the leveled BGV algorithm based on LWE, d denotes that a mode of a ciphertext is $q_d$, $\kappa$, m, n, $\varphi$ and $\chi$ denote parameters of the foregoing algorithm, where $\kappa$ is a security parameter, m, n are respectively dimensions, $\varphi$ and $\chi$ respectively denote a key probability distribution and a noise probability distribution. $B_\varphi$, $B_\chi \in Z$ denotes a boundary of the probability distributions $\varphi$ and $\chi$. $|x| \leq B_\varphi$ (or $|x| \leq B_\chi$) is checked every time $x \leftarrow \varphi$ (or $x \leftarrow \chi$) is sampled. In response to a condition not being met, re-sampling is performed. $B_{eval}$ denotes a noise boundary of evaluation key calculation, $B_{enc}$ denotes a noise boundary of encryption calculation, and $B_{dec}$ is a noise boundary of decryption calculation.

In some embodiments, the public random number includes:

$$\{A_d \xleftarrow{\$} Z_{q_d}^{m \times n}\}_{d \in \{0, \ldots, D\}},$$

$$\{a_{d,i,\tau}^k \xleftarrow{\$} Z_{q_d}^n : {}^{k \in [N], i \in [n]}_{d \in [D], \tau \in \{0, \ldots, \lfloor \log(q_d) \rfloor\}}\},$$

where $d \in \{0, \ldots, D\}$; $i \in [n]$, $[n]$ represents a set of all integers from 1 to n, $\tau \in \{0, \ldots, \lfloor \log q_d \rfloor\}$; N denotes a number of the data providing nodes, D denotes the leveled BGV algorithm based on LWE and supports a maximum multiplication level of a circuit.

Further, the data providing node may generate its own private key fragment based on the key generation parameters and a private key generation algorithm after acquiring the key generation parameters. The private key generation algorithm is E.SymKeygen (params), and the public parameter in the key generation parameters is input into the private key generation algorithm, so that the private key fragment corresponding to the data providing node may be output.

A data provider node $P_k$ generates its own private key fragment $s_d^k$ based on the public parameter in the key generation parameters. $P_k$ first calls a private key generation algorithm of the leveled BGV algorithm based on LWE, to generate $s_d^k \leftarrow$ E.SymKeygen(params$_d$) for each $d \in \{0, \ldots, D\}$.

At S302, an encryption public key fragment of the data providing node is generated based on the private key fragment.

Further, the data providing node may generate the encryption public key fragment of the data providing node based on the private key fragment, the public random number and an encryption public key generation algorithm after acquiring the private key fragment. The encryption public key generation algorithm is E.PubKeygen(s). Further, the private key fragment and the public random number are input into the encryption public key generation algorithm, to output the encryption public key fragment corresponding to the data providing node.

The data providing node $P_k$ generates its own encryption public key fragment ($A_d$, $p_d^k$) based on the private key fragment and the public random parameter in the key generation parameters. $P_k$ first calls an encryption public key generation algorithm of the leveled BGV algorithm based on LWE, to generate ($A_d$, $p_d^k$)$\leftarrow$E.PubKengen($s_d^k$; $A_d$) for each $d \in \{0, \ldots, D\}$, where $p_d^k = A_d \cdot s_d^k + 2 \cdot e_d^k$.

At S303, a target intermediate result corresponding to the evaluation public key is generated based on the private key fragment.

The data providing node may generate a first intermediate result of the evaluation public key corresponding to the data providing node based on the private key fragment, the public random number, and an evaluation public key generation algorithm after acquiring the private key fragment. The evaluation public key generation algorithm is E.symEnc(s). The private key fragment and the public random number are input into the evaluation public key generation algorithm, to output the first intermediate result of the evaluation public key corresponding to the data providing node.

The data provider node $P_k$ generates a first intermediate result $\{b_{d,i,\tau}^{l,k}\}_{l,d,i,\tau}$ of the evaluation public key based on the private key fragment and the public random number in the key generation parameters. $P_k$ first calls the evaluation public key generation algorithm to calculate as follows for each $d \in \{0, \ldots, D\}$, $i \in [n]$, $[n]$ denotes a set of all integers from 1 to n, $\tau \in \{0, \ldots, \lfloor \log q_d \rfloor\}$:

$$(a_{d,i,\tau}^k, b_{d,i,\tau}^{k,k}) \leftarrow E.SymEnc_{s_d^k}(2^\tau \cdot s_{d-1}^k[i]; a_{d,i,\tau}^k),$$

where, $b_{d,i,\tau}^{k,k} = \langle a_{d,i,\tau}^k, s_d^k \rangle + 2e_{d,i,\tau}^{k,k} + 2^\tau \cdot s_{d-1}^k[i]$; $s_{d-1}^k[i]$ denotes an i-th component denoted by $s_{d-1}^k$.

In addition, for each d, i, $\tau$, and each $l \in [N]-\{k\}$, the data providing node $P_k$ calculates that $$(a_{d,i,\tau}^l, b_{d,i,\tau}^{l,k}) \leftarrow E.SymEnc_{s_d^k}(0; a_{d,i,\tau}^l),$$

where $b_{d,i,\tau}^{l,k} = \langle a_{d,i,\tau}^l, s_d^k \rangle + 2e_{d,i,\tau}^{l,k}$.

After acquiring the first intermediate result of the evaluation public key, the data providing node may send its own first intermediate result to other data providing nodes. For example, the data providing node may broadcast its own first intermediate result. Similarly, other data providing nodes may broadcast respective first intermediate results. Correspondingly, the data providing node may receive respective first intermediate results broadcast by other data providing nodes. After acquiring the first intermediate results of other data providing nodes, the data providing node may further obtain a second intermediate result of the evaluation public key in combination with the first intermediate result of the data providing node itself. The data providing node Pk may calculate a second intermediate result $\beta_{d,i,\tau}^l$ when obtaining $\{b_{d,i,\tau}^{l,k}\}_{l,d,i,\tau}$. $P_k$ may calculate the second intermediate result based on $\beta_{d,i,\tau}^l := \sum_{l=1}^{N} b_{d,i,\tau}^{l,k}$. In case of all data owners complying with a protocol, an operation may be performed as follows: $(a_{d,i,\tau}^l, \beta_{d,i,\tau}^l) \leftarrow E.SymEnc_{s*_d}(2^\tau \cdot s_{d-1}^l[i]; a_{d,i,\tau}^l; e)$, where $e = \sum_{l=1}^{N} e_{d,i,\tau}^{l,k}$. In an implementation, the evaluation public key is $E.SymEnc_{s*_d}(2^\tau \cdot s*_{d-1}[i] \cdot s*_{d-1}[j])$, and the calculated second intermediate result $(a_{d,i,\tau}^l, \beta_{d,i,\tau}^l)$ has been approximate to the evaluation public key.

Further, the data providing node may acquire a target intermediate result $(\alpha_{d,i,j,\tau}^{l,k}, \beta_{d,i,j,\tau}^{l,k})$ of the evaluation public key based on the private key fragment, the public random number in the key generation parameters and the second intermediate result after acquiring the second intermediate result.

For example, after acquiring the second intermediate result $\beta_{d,i,\tau}^l$, and performs the above operation for each $l \in [N]$, $d \in [D]$, i, $j \in [n]$, $\tau \in \{0, \ldots, \lfloor \log q_d \rfloor\}$, the data providing node $P_k$ performs operations that $$(v_{d,i,j,\tau}^{l,k}, w_{d,i,j,\tau}^{l,k}) \leftarrow E.PubEnc_{p_d^*}(0),$$

$$e \leftarrow^\$ [-B_{eval}, B_{eval}] \text{ and}$$

$$(\alpha_{d,i,j,\tau}^{l,k}, \beta_{d,i,j,\tau}^{l,k}) := s_{d-1}^k[j] \cdot (a_{d,i,\tau}^l, \beta_{d,i,\tau}^l) + (v_{d,i,j,\tau}^{l,k}, w_{d,i,j,\tau}^{l,k} + 2e).$$

After performing the foregoing operations, the target intermediate result $$(\alpha_{d,i,j,\tau}^{l,k}, \beta_{d,i,j,\tau}^{l,k})$$

corresponding to the evaluation public key may be more approximate to $2^\tau \cdot s_{d-1}^l[i] \cdot s_{d-1}^k[j]$, which is more closer to the evaluation public key.

At S304, the encryption public key fragment and the target intermediate result corresponding to the evaluation public key are broadcast.

At S305, encryption public key fragments and target intermediate results sent by other participating nodes are received respectively.

At S306, the encryption public key is generated based on respective encryption public key fragments, and the evaluation public key is generated based on respective target intermediate results.

The specific processings of steps S304~S06 are introduced below.

In embodiments of the present disclosure, the data providing node may send the encryption public key fragment of the data providing node to other data providing nodes after acquiring the encryption public key fragment of the data providing node. For example, the data providing node may broadcast its own encryption public key fragment. Similarly, other participating nodes may broadcast respective encryption public key fragments. Correspondingly, the data providing node may receive the encryption public key fragments respectively broadcast by other participating nodes. After acquiring the encryption public key fragments of other participating nodes, the encryption public key may be recovered in combination with the encryption public key fragment of the data providing node.

The data providing node $P_k$ acquires $\{p_d^k\}_d$, where $\{p_d^k\}_d$ is configured to denote a set of encryption public key fragments of all data providing ends. $P_k$ may calculate an encryption public key $pk := (A_0, p*_0)$ after acquiring the set. $P_k$ may calculate the encryption public key based on $p*_d := \sum_{l=1}^{N} p_d^l$.

In a process of homomorphic encryption, in response to each of the data providing nodes following a protocol, that is, each of the data providing nodes is a trusted data provider, the encryption public key generation algorithm is $(A_d, p*_d) = E.PubKeygen(s*_d; A_d; e*_d)$, where $p*_d = A_d \cdot s*_d + 2 \cdot e*_d$, $s*_d := \sum_{l=1}^{N} s_d^l$, $e*_d := \sum_{l=1}^{N} e_d^l$, where $l \in [N]$, $d \in [D]$.

Further, the data providing node may send the target intermediate result to other participating nodes after acquiring the target intermediate result of the evaluation public key. For example, the data providing node may broadcast its own target intermediate result. Similarly, other data providing nodes may broadcast respective target intermediate results. Correspondingly, the data providing node may receive respective target intermediate results broadcast by the other data providing nodes. After acquiring the target intermediate results of other data providing nodes, the evaluation public key may be recovered in combination with the target intermediate result of the data providing node.

The data providing node $P_k$ owns an input setup, $\beta_{d,i,\tau}^l$, $(\alpha_{d,i,j,\tau}^{l,k}, \beta_{d,i,j,\tau}^{l,k})$, to calculate and output an evaluation key $\varphi_{d,i,j,\tau}$. For each $l \in [N]$, $d \in [D]$, $i \in [n]$, $j \in [n] \cup \{0\}$, $\tau \in \{0, \ldots, \lfloor \log q \rfloor\}$, $P_k$ may perform the following calculation to calculate the evaluation public key by the following formula:

$$\varphi_{d,i,j,\tau} := \begin{cases} \sum_{l=1}^{N} \sum_{k=1}^{N} \left( \alpha_{d,i,j,\tau}^{l,k}, \beta_{d,i,j,\tau}^{l,k} \right) & j \neq 0 \\ \sum_{l=1}^{N} \left( a_{d,i,\tau}^{l}, \beta_{d,i,\tau}^{l} \right), & j = 0 \end{cases}.$$

Correspondingly, other participating nodes may receive respective encryption public key fragments broadcast by other participating nodes, and a complete encryption public key may be acquired in a similar manner. Other participating nodes each may calculate the evaluation public key based on a calculation equation of the evaluation public key. For example, a process that the data using node in other participating nodes acquires the encryption public key is similar with a process that the data providing node in other participating nodes acquires the encryption public key, and the data using node in other participating nodes may acquire the complete encryption public key and the evaluation public key based on the above interactive cooperation process, which will not be repeated herein.

The data providing node calls an encryption algorithm after acquiring the encryption public key, in which the encryption algorithm is $E.\text{PubEnc}_{pk}(\mu)$, and obtain the ciphertext data by encrypting its own data by using the encryption algorithm. For example, the data providing node $P_k$ calculates $(v, w) \leftarrow E.\text{Enc}_{pk}(\mu)$ by calling the encryption algorithm, to finally acquire the ciphertext data $c_k=((v, w+2e), 0)$, where 0 indicates that a multiplication level is 0, $$e \leftarrow^\$ [-B_{enc}, B_{enc}].$$

The data providing node may send the evaluation public key to a coordination node after acquiring the evaluation public key, so that the coordination node encrypts model parameters with the evaluation public key to generate ciphertext model parameters.

For example, the coordination node may calculate the ciphertext calculation result by encrypting each piece of ciphertext data based on the evaluation public key by calling an $\text{Eval}_{evk}$ encryption algorithm, that is, $\text{Eval}_{evk}(f, c_1, \ldots, c_l)$. The evaluation algorithm $\text{Eval}_{evk}(f, c_l, c_l)$ is same as $E.\text{Eval}_{evk}(m, c_1, \ldots, c_n)$.

In a process of generating the key provided in embodiments of the present disclosure, two rounds of protocol are performed between N data providing nodes and a data using node, the input is setup and the outputs are an evaluation public key $evk=\{\varphi_{d,i,j,\tau}\}_{d,i,j,\tau}$ and an encryption public key $pk=(A_0, p^*_0)$, and each data owner obtains a private key part $s_D^k$. In embodiments of the present disclosure, a multi-party homomorphic encryption mechanism is constructed, which may achieve homomorphic encryption of encrypted data of a plurality of data providing nodes, and expand application scenarios of the homomorphic encryption. In embodiments of the present disclosure, the encryption data may be further encrypted based on the evaluation public key in a cooperation stage, thereby ensuring security of multi-source data processing better.

Figure 4:
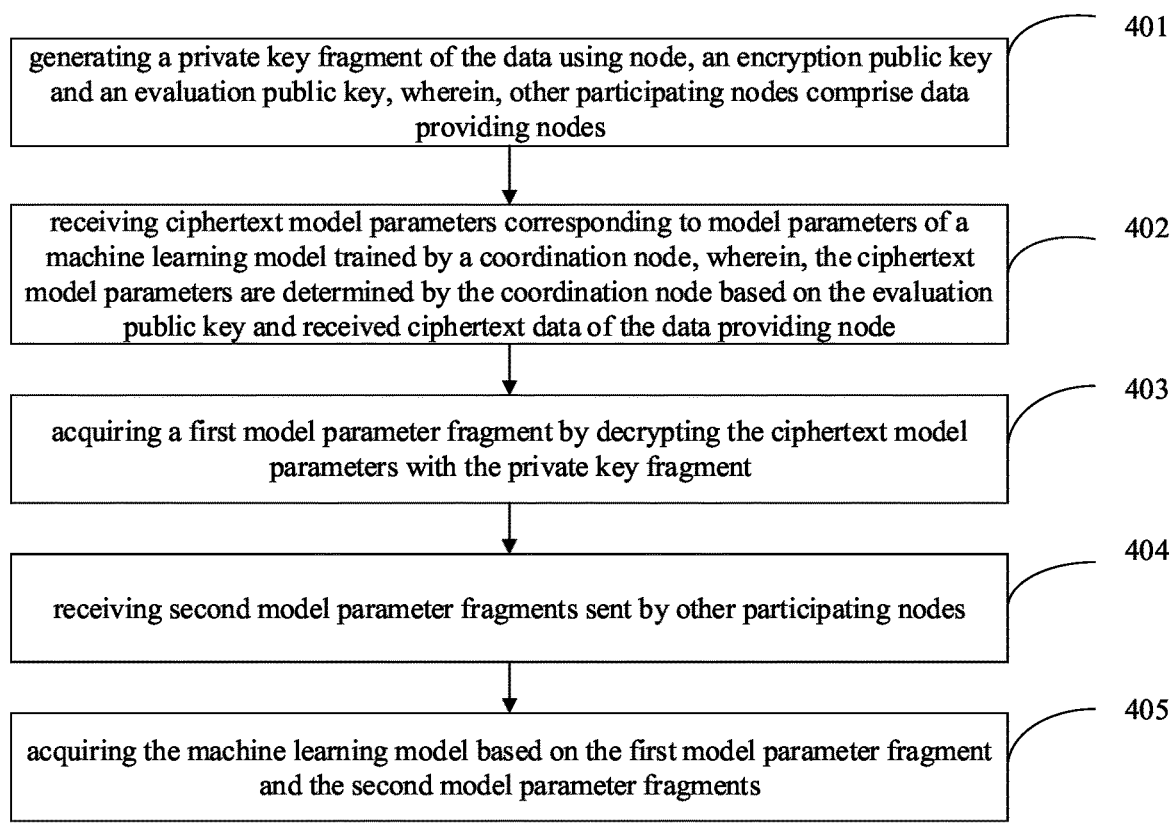
FIG. 4 is a flowchart illustrating a method for processing multi-source data in another embodiment of the present disclosure.

FIG. 4 is a flowchart illustrating a method for processing multi-source data in another embodiment of the present disclosure. As illustrated in FIG. 4, an executive subject is a data using node. The method for processing multi-source data includes the following steps S401 to S405.

At S401, a private key fragment of the data using node, as well as an encryption public key and an evaluation public key are generated. Other participating nodes include data providing nodes.

In embodiments of the present disclosure, the private key fragment of the data providing node, as well as the encryption public key and the evaluation public key are generated by interactive cooperation between the data using node and other data participating nodes. Other participating nodes include at least one data providing node. In some implementations, the data using node may acquire key generation parameters. The key generation parameters include a public parameter and a public random number. The data using node may generate its own private key fragment based on the key generation parameters. The process that the data using node generates the private key fragment is similar with the process that the data providing node generates the private key fragment, and which may refer to a description of other contents in the above embodiments, and will not be repeated herein.

The data using node may generate an encryption public key fragment of the data using node based on the private key fragment after acquiring the private key fragment of the data using node, and broadcast the encryption public key fragment. Correspondingly, the data using node may receive encryption public key fragments sent by the data providing nodes, and generate the encryption public key based on respective encryption public key fragments. The process that the data using node acquires the encryption public key is similar with the process that the data providing node acquires the encryption public key, which may refer to a description of other contents in the above embodiments, and will not be repeated herein.

The data using node may generate a target intermediate result corresponding to the evaluation public key fragment of the data using node based on the private key fragment after acquiring the private key fragment of the data using node, and broadcast the target intermediate result. Correspondingly, the data using node may acquire target intermediate results of evaluation public keys sent by the data providing nodes, and further acquire the evaluation public key based on respective target intermediate results. The process that the data using node acquires the evaluation public key is similar with the process that the data providing node acquires the evaluation public key, which may refer to a description of other contents in the above embodiments, and will not be repeated herein.

When a plurality of data providing nodes are required to provide data simultaneously, in order to prevent the data of the data providing node from being leaked or stolen, in embodiments of the present disclosure, the data providing node is required to encrypt local data with the encryption public key, and generate one piece of ciphertext data. The data providing node may send the ciphertext data to a coordination node after generating the ciphertext data.

Correspondingly, the coordination node may receive respective pieces of ciphertext data sent by a plurality of data providing nodes. Further, in order to acquire a machine learning model, the coordination node may train a machine learning mode based on the pieces of ciphertext data after acquiring the pieces of ciphertext data.

At S402, ciphertext model parameters corresponding to model parameters of a machine learning model trained by a coordination node are received. The ciphertext model parameters are determined by the coordination node based on the evaluation public key and the received ciphertext data of the data providing node.

The coordination node processes each piece of ciphertext data by means of a homomorphic encryption algorithm after receiving the ciphertext data sent by each data providing node, and trains and tests the machine learning model based on processed ciphertext data, to obtain a ciphertext model. Further, the coordination node generates ciphertext model parameters by performing an encryption calculation on model parameters of the ciphertext model based on the evaluation public key, and sends the ciphertext model parameters to the data providing nodes and the data using node respectively.

Correspondingly, the data using node may receive the ciphertext model parameters sent by the coordination node.

At S403, a first model parameter fragment is acquired by decrypting the ciphertext model parameters with the private key fragment of the data using node.

In embodiments of the present disclosure, the data using node owns a part of the private key, that is, one piece of private key fragment, but cannot directly acquire a complete private key. The data using node may decrypt the ciphertext model parameters with its own private key fragment after receiving the ciphertext model parameters. Since complete model parameters may not be obtained by decrypting with the private key fragment, in embodiments of the present disclosure, the data using node obtains one piece of model parameter fragment, that is, a first model parameter fragment, by decrypting the ciphertext model parameters.

At S404, second model parameter fragments sent by other participating nodes are received.

In order to ensure data security of each data providing node, each data providing node owns a part of the private key, that is, one piece of private key fragment, but cannot directly acquire the complete private key. After receiving the ciphertext model parameters, the data providing node may decrypt the ciphertext model parameters with its own private key fragment, to obtain one piece of model parameter fragment, that is, a second model parameter fragment. After acquiring the second model parameter fragment, in order to completely decrypt data, each data providing node may send the second model parameter fragment to other participating nodes in case of being authorized, so that the data using node may acquire the second model parameter fragment of the data providing node, to obtain plaintext model parameters by decrypting.

In some embodiments, each data providing node may broadcast its own second model parameter fragment out, and the data using node may monitor each second model parameter fragment. In some embodiments, each data providing node may directly send the second model parameter fragment to the data using node, which is only illustrative, and the method for sending the second model parameter fragment is not limited in embodiments of the present disclosure.

The data providing node $P_k$ calculates a second model parameter fragment $w^k = \langle v, s_D^k \rangle + 2e_k$ by decrypting the received ciphertext model parameters with its own private key fragment $s_D^k$, where $e_k \leftarrow^\$ [-B_{dec}, B_{dec}]$.

Then, $P_k$ broadcasts the second model parameter fragment $w^k$.

Correspondingly, the data using node may receive the second model parameter fragment sent by each data providing node.

At S405, a machine learning model is acquired based on the first model parameter fragment and the second model parameter fragments.

Decrypting a secret may be required to acquire enough pieces of secret fragments based on a secret sharing mechanism. In embodiments of the present disclosure, the data providing nodes may share with the data using node intermediate decrypted data obtained, to ensure that the data using node may acquire enough pieces of model parameter fragments, to further obtain the plaintext model parameters by decrypting. In embodiments of the present disclosure, the data using node may receive a model parameter fragment, c=(v, w, D), sent by the data providing node, where D is a multiplication level. The data using node may acquire the plaintext model parameters by fusing the first model parameter fragment with the second model parameter fragments a, for example, by performing a homomorphic addition or multiplication on the first model parameter fragment and the second model parameter fragments, further acquire a trained machine learning model.

The data providing node $P_k$ may acquire its own $w^k = \langle v, s_D^k \rangle + 2e_k$, and the data using node fuses the first model parameter fragment with the second model parameter fragments by a formula $\Sigma_{i=1}^N w^i$. Further, the plaintext model parameters may be obtained by decrypting based on a formula $\mu = [w - \Sigma_{i=1}^N w^i]_{q_D} \mod 2$.

According to the method for processing multi-source data of a machine learning model provided in embodiments the disclosure, with constructing a multi-party threshold homomorphic encryption mechanism, a purpose of performing homomorphic encryption on encrypted data of a plurality of data providing nodes may be achieved. Not only application scenarios of the homomorphic encryption are expanded, but also encrypted data may be further encrypted based on the evaluation public key in a coordination stage, which ensures security of training of a federated learning model better. Since a threshold homomorphic encryption technology is adopted, in a process of training the model by simultaneously acquiring data from a plurality of data sources, security of data and security of model training may be ensured. And on the basis of breaking isolated data island, the plurality of data sources may be simultaneously trained, to obtain the machine learning model with a better performance. And the data is transmitted based on a homomorphic encryption algorithm, which not only may protect security of sample data of the data providing nodes, to prevent information leakage of data providers, but also may ensure security of the model parameters of the model training.

On the basis of the above embodiments, in order to achieve encryption and decryption of the data, before ciphertext data are generated by encrypting local data with an encryption public key, an interactive cooperation between the data providing nodes and the data using node is further required to perform to generate a key.

The data using node generates a private key fragment of the data using node first, then generates an encryption public key fragment of the data using node based on the private key fragment, and broadcasts the encryption public key fragment, so that the data providing nodes may acquire the encryption public key fragment, further to acquire an encryption public key. Specifically, the data using node acquires key generation parameters including a public parameter and a public random number. The private key fragment is generated based on the public parameter and a private key generation algorithm. The specific process that the data using node generates its own private key fragment may refer to a specific process that the data providing node generates the private key fragment, which will not be repeated herein.

Figure 5:
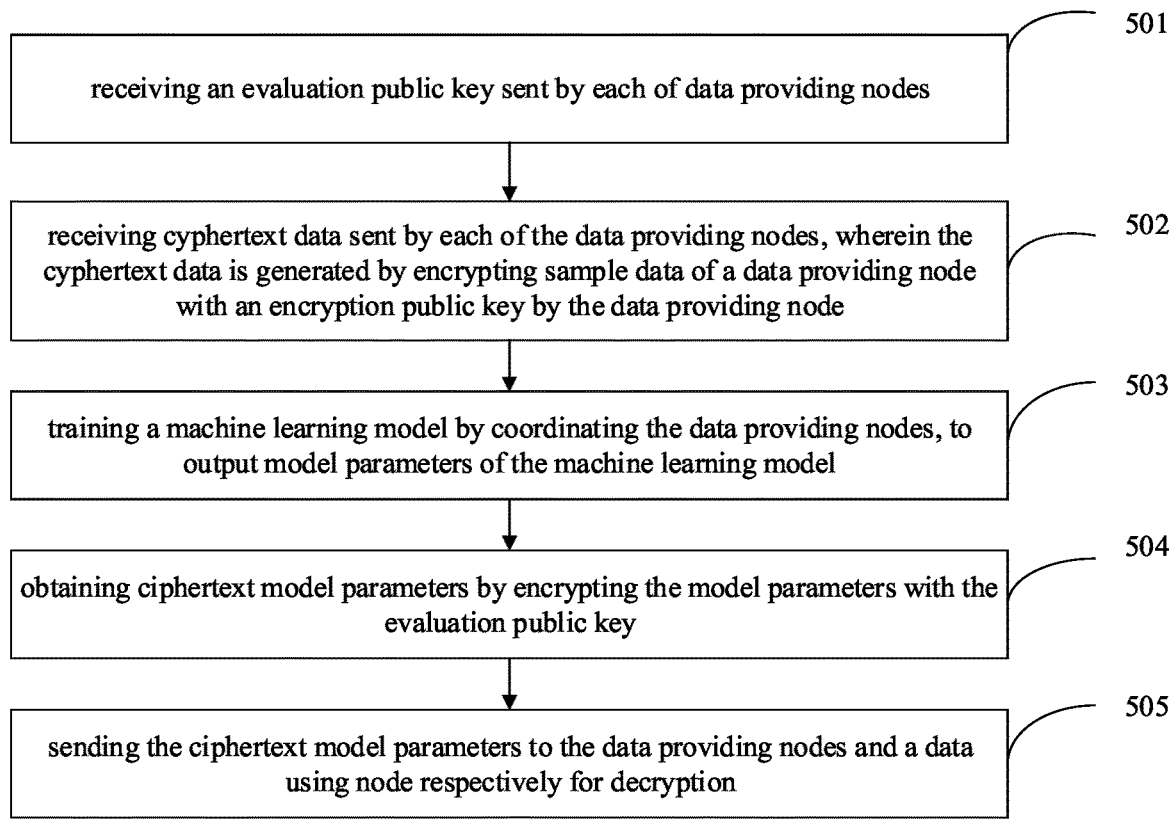
FIG. 5 is a flowchart illustrating a method for processing multi-source data in another embodiment of the present disclosure.

FIG. 5 is a flowchart illustrating a method for processing multi-source data in another embodiment of the present disclosure. As illustrated in FIG. 5, an executive subject is a coordination node. The method for processing multi-source data includes the following steps S501 to S505.

At S501, an evaluation key sent by each of data providing nodes is received.

The process that the data providing node generates the encryption key may refer to a record of relevant contents in the above embodiments, which will not be repeated here.

The data providing node may send the evaluation key generated to the coordination node after generating the encryption key in order to ensure security of model parameters transmitted by the coordination node.

At S502, cyphertext data sent by each of the data providing nodes are received. The cyphertext data is generated by encrypting sample data of a data providing node with an encryption public key by the data providing node.

In order to achieve training of a machine learning model, the data providing node is required to send to the coordination node cyphertext data generated by encrypting sample data with the encryption public key. The coordination node may train the machine learning model based on respective pieces of cyphertext data after receiving respective pieces of ciphertext data sent by the data providing nodes.

At S503, a machine learning model is trained by coordinating the data providing nodes, to output model parameters of the machine learning model.

In some embodiments, the coordination node processes each piece of ciphertext data based on a homomorphic encryption algorithm, and coordinates respective data providing nodes to train and test the machine learning model based on the ciphertext data processed, and further a ciphertext machine learning model is obtained.

At S504, ciphertext model parameters are obtained by encrypting the model parameters with the evaluation public key.

At S505, the ciphertext model parameters are respectively sent to the data providing nodes and a data using node for decryption.

The coordination node generates the ciphertext model parameters by performing an encryption calculation on the model parameters of the ciphertext model based on the evaluation public key, and respectively sends the ciphertext model parameters to the data providing nodes and the data using node.

Correspondingly, the data using node may receive the ciphertext model parameters sent by the coordination node.

In embodiments of the present disclosure, the data using node owns a part of the private key, that is, one piece of private key fragment, but cannot directly acquire a complete private key. The data using node may decrypt the ciphertext model parameters with its own private key fragment after receiving the ciphertext model parameters. Since complete model parameters may not be obtained by decrypting with the private key fragment, in embodiments of the present disclosure, the data using node obtains one piece of model parameter fragment, that is, a first model parameter fragment, by decrypting the ciphertext model parameters. In order to ensure data security of each data providing node, each data providing node owns a part of the private key, that is, one piece of private key fragment, but cannot directly acquire the complete private key. After receiving the ciphertext model parameters, the data providing node may decrypt the ciphertext model parameters with its own private key fragment, to obtain one piece of model parameter fragment, that is, a second model parameter fragment. After acquiring the second model parameter fragment, in order to completely decrypt data, each data providing node may send the second model parameter fragment to other participating nodes in case of being authorized, so that the data using node may acquire the second model parameter fragment of the data providing node, to obtain plaintext model parameters by decrypting.

In some embodiments, each data providing node may broadcast its own second model parameter fragment out, and the data using node may monitor each second model parameter fragment. In some embodiments, each data providing node may directly send the second model parameter fragment to the data using node, which is only illustrative, and the method for sending the second model parameter fragment is not limited in embodiments of the present disclosure.

Correspondingly, the data using node may receive the second model parameter fragment sent by each data providing node.

Decrypting a secret may be required to acquire enough pieces of secret fragments based on a secret sharing mechanism. In embodiments of the present disclosure, the data providing nodes may share with the data using node intermediate decrypted data obtained, to ensure that the data using node may acquire enough pieces of model parameter fragments, to further obtain the plaintext model parameters by decrypting. Further, a trained machine learning model may be obtained.

According to the method for processing multi-source data in embodiments the disclosure, with constructing a multi-party threshold homomorphic encryption mechanism, a purpose of performing homomorphic encryption on encrypted data of a plurality of data providing nodes may be achieved. Not only application scenarios of the homomorphic encryption are expanded, but also encrypted data may be further encrypted based on the evaluation public key in a coordination stage, which ensures security of training of a federated learning model better. Since a threshold homomorphic encryption technology is adopted, in a process of training the model by simultaneously acquiring data from a plurality of data sources, security of data and security of model training may be ensured. And on the basis of breaking isolated data island, the plurality of data sources may be simultaneously trained, to obtain the machine learning model with a better performance. And the data is transmitted based on a homomorphic encryption algorithm, which not only may protect security of sample data of the data providing nodes, to prevent information leakage of data providers, but also may ensure security of the model parameters of the model training.

Symbols in a homomorphic encryption algorithm in the above embodiments are explained and agreed below.

E denotes a leveled BGV algorithm based on LWE, a supported maximum multiplication level of a circuit is D, and a plaintext space is $\{0, 1\}$. TFHE denotes a threshold homomorphic encryption. Assuming that there are N data owners and one data user. A vector is represented by a bold lower case letter, and a scalar is represented by a lower case letter. When s is a vector, s[i] represents an i-th component of s, agreeing that s[0]=1. Assuming that $\mathcal{D}$ denotes a probability distribution on a finite set S, $x \leftarrow \mathcal{D}$ denotes that x is sampling of $\mathcal{D}$, and $x \xleftarrow{\$} S$ denotes that x is uniformly distributed sampling on S. Bases of all logarithms are 2. When n is a positive integer, [n] denotes a set of all integers from 1 to N.

E includes the following basic components:
1) params=($1^\kappa$, q, m, n, φ, χ), where params are implicit inputs of all algorithms, κ is a security parameter, q is an odd mode, m and n are dimensions, φ and φ are probability distributions on $\mathbb{Z}_q$;

2) E.SymKeygen(params): a private key $s \leftarrow \varphi^n$ is generated;

3) E.PubKeygen(s):

$$A \xleftarrow{\$} \mathbb{Z}_q^{m \times n},$$

$e \leftarrow \chi^m$ are generated, and p:=A·s+2·e is set, and a public key pk:=(A, p) corresponding to a private key s is output;

4) E.SymEnc$_s$(μ): μ∈{0, 1} is to be encrypted, $a \leftarrow \mathbb{Z}_q^n$, $e \leftarrow \chi$ are selected, and b:=⟨ a, s ⟩ +2·e+μ is set, a ciphertext c=(a,b) is output;

5) E.PubEnc$_{pk}$(μ): μ∈{0, 1} is to be encrypted with a public key pk=(A, p), $r \leftarrow \{0, 1\}^m$ is selected, and a:=$r^T$·A, b:=⟨ r,p ⟩ +μ are set, a ciphertext c=(a, b) is output;

6) c=(a, b) is decrypted to output a plaintext [b−⟨ a,s ⟩ ]$_q$ mod2;

7) A function ƒ is calculated by using an evaluation key evk based on an evaluation algorithm E.Eval$_{evk}$(ƒ, $c_1, \ldots, c_l$), ƒ: $\{0, 1\}^l \to \{0, 1\}$ denotes a Boolean circuit with an input of l pieces of ciphertext $c_1, \ldots, c_l$, and an output of a ciphertext result $c_f$.

E.PubKeygen(s; A) denotes a public key generation algorithm performed by using a fixed coefficient A. PubKeygen (s; A; e) denotes a public key generation algorithm denotes by using the fixed coefficient A and a noise e. E.SymEnc$_s$(μ; a) denotes encrypting μ with a fixed coefficient a and a private key s. E.SymEnc$_s$(μ; a; e) denotes encrypting μ with the fixed coefficient a, the noise e and a private key s.

Figure 6:
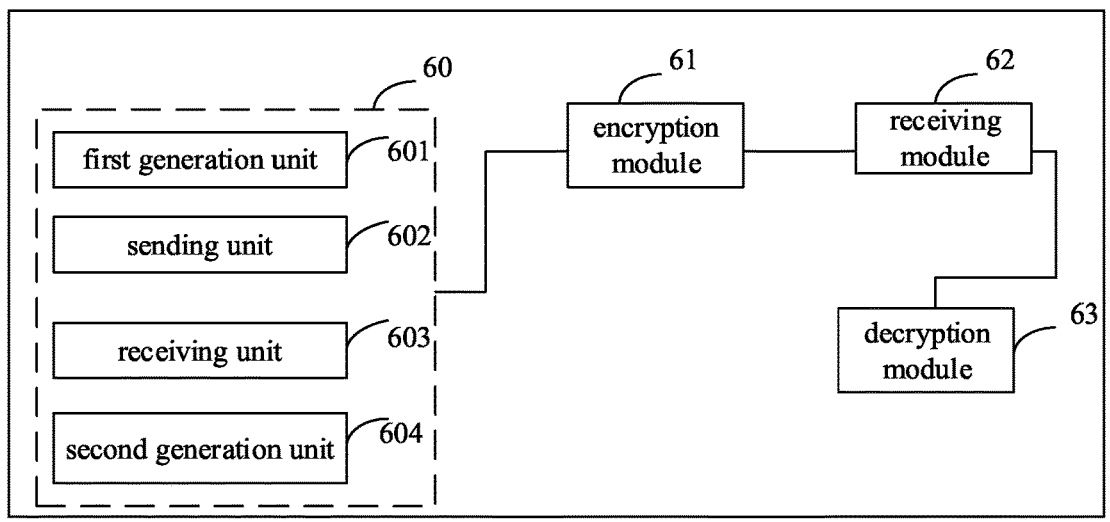
FIG. 6 is a diagram illustrating a structure of an apparatus for processing multi-source data in an embodiment of the present disclosure.

FIG. 6 is a diagram illustrating a structure of an apparatus for processing multi-source data in an embodiment of the present disclosure. As illustrated in FIG. 6, the apparatus for processing multi-source data is applicable for a data providing node, and includes a key generation module 60, an encryption module 61, a receiving module 62 and a decryption module 63.

The key generation module 60 is configured to generate a private key fragment of the data providing node, an encryption public key and an evaluation public key. Other participating nodes include other data providing nodes and a data using node.

The encryption module 61 is configured to generate ciphertext data by encrypting local sample data with the encryption public key, and send the ciphertext data to a coordination node for training a machine learning model.

The receiving module 62 is configured to receive model parameters corresponding to model parameters of the machine learning model trained by the coordination node. The ciphertext model parameters are determined by the coordination node based on the evaluation public key and the ciphertext data received.

The decryption module 63 is configured to decrypt the ciphertext model parameters with the private key fragment, and send a decrypted model parameter fragment to the data using node.

In some embodiments, the key generation module 60 includes a first generation unit 601, a sending unit 602, a receiving unit 603 and a second generation unit 604.

The first generation unit 601 is configured to generate a private key fragment of the data providing node, and generate an encryption public key fragment of the data providing node and a target intermediate result corresponding to the evaluation public key based on the private key fragment.

The sending unit 602 is configured to broadcast the encryption public key fragment and the target intermediate result.

The receiving unit 603 is configured to receive respective encryption public key fragments and target intermediate results sent by other participating nodes.

The second generation unit 604 is configured to generate the encryption public key based on respective encryption public key fragments, and generate the evaluation public key based on respective target intermediate results.

Further, the sending unit 602 is further configured to send the evaluation public key to the coordination node after generating the evaluation public key.

Further, the first generation unit 601 is further configured to acquire key generation parameters, in which, the key generation parameters include a public parameter and a public random number; and acquire the private key fragment based on the public parameter and a private key generation algorithm.

Further, the first generation unit 601 is further configured to: generate the encryption public key fragment based on the private key fragment, the public random number and an encryption public key generation algorithm; and generate the target intermediate result based on the private key fragment and an evaluation public key generation algorithm.

In some embodiments, the first generation unit 601 is further configured to: generate a first intermediate result of the evaluation public key based on the private key fragment, the public random number and the evaluation public key generation algorithm, and broadcast the first intermediate result; receive respective first intermediate results sent by other data providing nodes; acquire a second intermediate result of the evaluation public key based on the first intermediate result of the evaluation public key and the first intermediate results of other data providing nodes; and acquire the target intermediate result of the evaluation public key based on the private key fragment, the public random number and the second intermediate result, and broadcast the target intermediate result.

According to the apparatus for processing multi-source data provided in embodiments the disclosure, with constructing a multi-party threshold homomorphic encryption mechanism, a purpose of performing homomorphic encryption on encrypted data of a plurality of data providing nodes may be achieved. Not only application scenarios of the homomorphic encryption are expanded, but also encrypted data may be further encrypted based on the evaluation public key in a coordination stage, which ensures security of training of a federated learning model better. Since a threshold homomorphic encryption technology is adopted, in a process of training the model by simultaneously acquiring data from a plurality of data sources, security of data and security of model training may be ensured. And on the basis of breaking isolated data island, the plurality of data sources may be simultaneously trained, to obtain the machine learning model with a better performance. And the data is transmitted based on a homomorphic encryption algorithm, which not only may protect security of sample data of the data providing nodes, to prevent information leakage of data providers, but also may ensure security of the model parameters of the model training.

Figure 7:
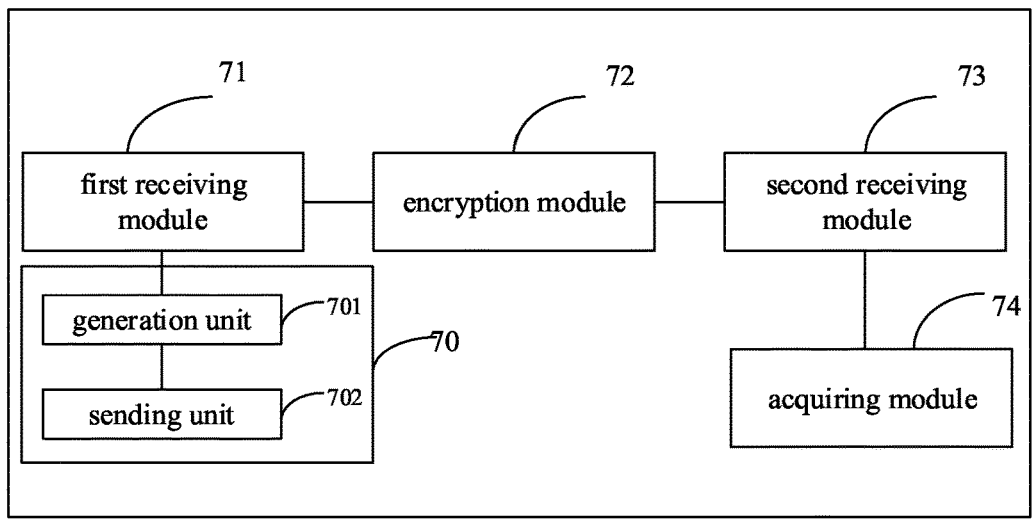
FIG. 7 is a diagram illustrating a structure of another apparatus for processing multi-source data in another embodiment of the present disclosure.

FIG. 7 is a diagram illustrating a structure of an apparatus for processing multi-source data in an embodiment of the present disclosure. As illustrated in FIG. 7, the apparatus for processing multi-source data is applicable for a data using node, and includes a key generation module 70, a first receiving module 71, a decryption module 72, a second receiving module 73 and an acquiring module 74.

The key generation module 70 is configured to generate a private key fragment of the data using node, an encryption public key and an evaluation public key. Other participating nodes include data providing nodes.

The first receiving module 71 is configured to receive model parameters corresponding to model parameters of the machine learning model trained by the coordination node. The ciphertext model parameters are determined by the coordination node based on the evaluation public key and the received ciphertext data of the data providing node.

The decryption module 72 is configured to acquire a first model parameter fragment by decrypting ciphertext model parameters with the private key fragment of the data using node.

The second receiving module 73 is configured to receive second model parameter fragments sent by other participating nodes.

The acquiring module 74 is configured to acquire a machine learning model based on the first model parameter fragment and the second model parameter fragments.

Further, the key generation module 70 includes a generation unit 701 and a sending unit 702.

The generation unit 701 is configured to generate the private key fragment of the data using node, and generate an encryption public key fragment of the data using node based on the private key fragment.

The sending unit 702 is configured to broadcast the encryption public key fragment.

Further, the generation unit 701 is further configured to acquire key generation parameters, in which the key generation parameters include a public parameter and a public random number; and acquire the private key fragment based on the public parameter and a private key generation algorithm.

According to the apparatus for processing multi-source data provided in embodiments the disclosure, with constructing a multi-party threshold homomorphic encryption mechanism, a purpose of performing homomorphic encryption on encrypted data of a plurality of data providing nodes may be achieved. Not only application scenarios of the homomorphic encryption are expanded, but also encrypted data may be further encrypted based on the evaluation public key in a coordination stage, which ensures security of training of a federated learning model better. Since a threshold homomorphic encryption technology is adopted, in a process of training the model by simultaneously acquiring data from a plurality of data sources, security of data and security of model training may be ensured. And on the basis of breaking isolated data island, the plurality of data sources may be simultaneously trained, to obtain the machine learning model with a better performance. And the data is transmitted based on a homomorphic encryption algorithm, which not only may protect security of sample data of the data providing nodes, to prevent information leakage of data providers, but also may ensure security of the model parameters of the model training.

Figure 8:
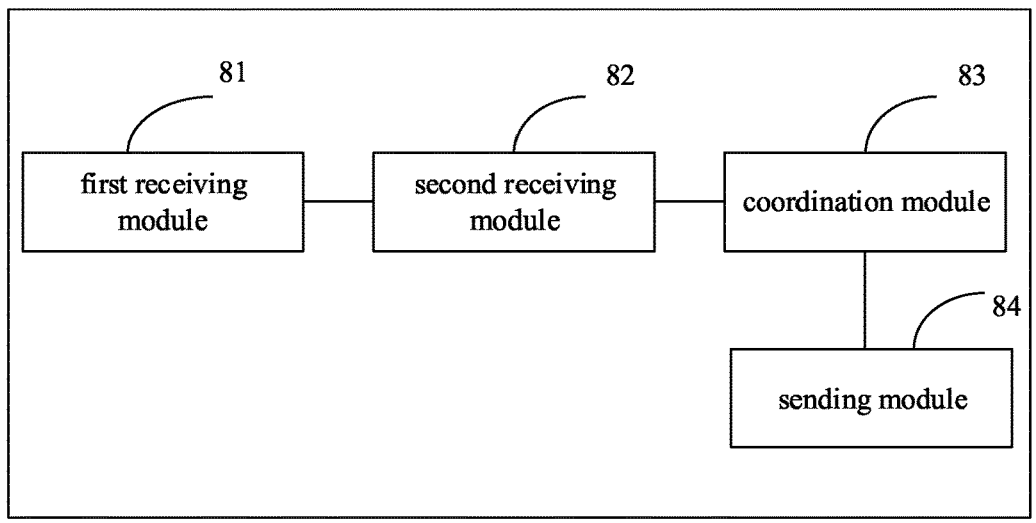
FIG. 8 is a diagram illustrating a structure of another apparatus for processing multi-source data in another embodiment of the present disclosure.
Figure 9:
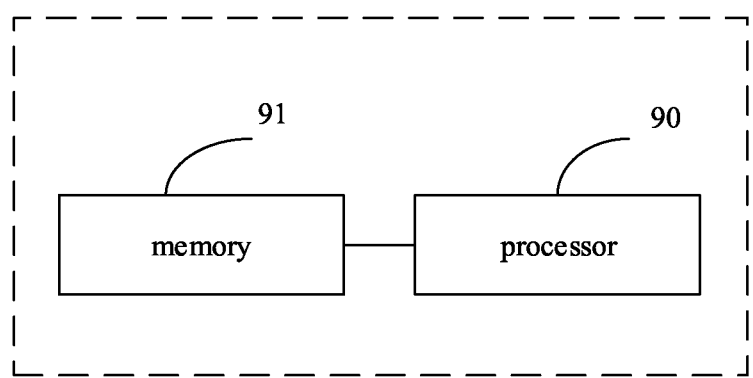
FIG. 9 is a diagram illustrating a structure of an electronic device provided in an embodiment of the present disclosure.

FIG. 8 is a diagram illustrating a structure of an apparatus for processing multi-source data in an embodiment of the present disclosure. As illustrated in FIG. 8, the apparatus for processing multi-source data is applicable for a coordination node, and includes a first receiving module 80, a second receiving module 81, a coordination module 82, an encryption module 83 and a sending module 84.

The first receiving module 80 is configured to receive an evaluation public key sent by each of data providing nodes.

The second receiving module 81 is configured to receive cyphertext data sent by each of the data providing nodes. The cyphertext data is generated by encrypting sample data of a data providing node with an encryption public key by the data providing node.

The coordination module 82 is configured to train a machine learning model by coordinating the data providing node, to output model parameters of the machine learning model.

The encryption module 83 is configured to obtain ciphertext model parameters by encrypting the model parameters with the evaluation public key.

The sending module 84 is configured to respectively send the ciphertext model parameters to the data providing nodes and a data using node for decryption.

According to the apparatus for processing multi-source data provided in embodiments the disclosure, with constructing a multi-party threshold homomorphic encryption mechanism, a purpose of performing homomorphic encryption on encrypted data of a plurality of data providing nodes may be achieved. Not only application scenarios of the homomorphic encryption are expanded, but also encrypted data may be further encrypted based on the evaluation public key in a coordination stage, which ensures security of training of a federated learning model better. Since a threshold homomorphic encryption technology is adopted, in a process of training the model by simultaneously acquiring data from a plurality of data sources, security of data and security of model training may be ensured. And on the basis of breaking isolated data island, the plurality of data sources may be simultaneously trained, to obtain the machine learning model with a better performance. And the data is transmitted based on a homomorphic encryption algorithm, which not only may protect security of sample data of the data providing nodes, to prevent information leakage of data providers, but also may ensure security of the model parameters of the model training.

It needs to be noted that, the foregoing explanation of embodiments of the method for processing multi-source data is also applicable to the apparatus for processing multi-source data in the embodiment, which will not be repeated here.

To achieve the above embodiments, an electronic device is further provided in the present disclosure, and includes a processor 90 and a memory 91. The processor 90 runs a program corresponding to an executable program code by reading the executable program code stored in the memory 91 to implement the method for processing multi-source data provided in the above embodiment.

In order to achieve the above purpose, a computer-readable storage medium with a computer program stored thereon is further provided in the present disclosure. The program implements the method for processing multi-source data provided in the above embodiment when performed by a processor.

In order to achieve the above embodiment, a computer program product is further provided in the present disclosure. Instructions in the computer program are configured to implement the method for processing multi-source data described in the above embodiment when executed by a processor.

In descriptions of the specification, descriptions with reference to terms "one embodiment", "some embodiments", "examples", "specific examples" or "some examples" etc. mean specific features, structures, materials or characteristics described in conjunction with the embodiment or example are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

In addition, the terms "first" and "second" used in the present disclosure are only for description purpose, and may not be understood as relative importance of indication or implication or number of technical features indicated by implication. Therefore, features limiting "first" and "second" may explicitly or implicitly include at least one of the features. In the description of the present disclosure, "a plurality of" means at least two, for example two, three, etc., unless otherwise specified.

Any process or method descriptions described in the flowchart or in other ways herein may be understood as a module, a segment or a part of a code including one or more executable instructions configured to implement blocks of customized logical functions or processes, and scopes of embodiments of the present disclosure include additional implementations, which may include implement functions not be in the order shown or discussed including the substantially simultaneous manner according to functions involved or in reverse order, which should be understood by those skilled in the art of embodiments of the present disclosure.

The logic and/or steps represented in the flowchart or described in other ways herein, for example, may be considered as an ordered list of an executable instruction configured to implement logic functions, which may be specifically implemented in any computer readable medium, for use by an instruction execution system, an apparatus or a device (such as a computer-based system, a system including a processor, or other systems that may obtain and execute instructions from an instruction execution system, an apparatus or a device) or in combination with the instruction execution systems, apparatuses or devices. A "computer readable medium" in this specification may be an apparatus that may contain, store, communicate, propagate or transmit a program for use by an instruction execution system, an apparatus or a device or in combination with the instruction execution systems, apparatuses or devices. A more specific example of a computer readable medium (a non-exhaustive list) includes the followings: an electronic connector (an electronic apparatus) with one or more cables, a portable computer disk box (a magnetic device), a random access memory (RAM), a read-only memory (ROM), an erasable programmable read-only memory (an EPROM or a flash memory), an optical fiber device, and a portable optical disk read-only memory (CDROM). In addition, a computer readable medium may be even paper or other suitable medium on which a program may be printed, since paper or other medium may be optically scanned, and then edited, interpreted or processed in other suitable ways if necessary to obtain a program electronically and store it in a computer memory.

It should be understood that all parts of the present disclosure may be implemented with a hardware, a software, a firmware and their combination. In the above implementation, multiple steps or methods may be stored in a memory and implemented by a software or a firmware executed by a suitable instruction execution system. For example, if implemented with a hardware, they may be implemented by any of the following techniques or their combination known in the art as in another implementation: a discrete logic circuit with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of steps in the above embodiments may be implemented by a program to instruct relevant hardware, in which the program may be stored in a computer readable storage medium including one or combination of steps in embodiments of the method when executing.

In addition, functional units in embodiments of the present disclosure may be integrated in a processing module, or may be physically existed separately, or two or more units may be integrated in a module. The above integrated module may be implemented in the form of a hardware or in the form of a software functional module. The integrated module may be stored in a computer readable storage medium if it is implemented in the form of a software functional module and sold and used as an independent product.

The foregoing storage medium may be a read-only memory, a magnetic disk or a compact disc, etc. It should be understood that, notwithstanding the embodiments of the present disclosure are shown and described above, the above embodiments are exemplary in nature and shall not be construed as a limitation of the present disclosure. Those skilled in the art may change, modify, substitute and vary the above embodiments within the scope of the present disclosure.

What is claimed is:

1. A method for processing multi-source data, applicable for a data providing node, comprising:
    generating a private key fragment of the data providing node, an encryption public key and an evaluation public key, wherein, other participating nodes comprise other data providing nodes and a data using node;
    generating ciphertext data by encrypting local sample data with the encryption public key, and sending the ciphertext data to a coordination node for training a machine learning model;
    receiving ciphertext model parameters corresponding to model parameters of the machine learning model trained by the coordination node, wherein, the ciphertext model parameters are determined by the coordination node based on the evaluation public key and the ciphertext data received; and
    decrypting the ciphertext model parameters with the private key fragment, and sending a decrypted model parameter fragment to the data using node.

2. The method according to claim 1, wherein generating the private key fragment of the data providing node, the encryption public key and the evaluation public key comprises:
- generating the private key fragment, and generating an encryption public key fragment of the data providing node and a target intermediate result corresponding to the evaluation public key based on the private key fragment;
- broadcasting the encryption public key fragment and the target intermediate result;
- receiving respective encryption public key fragments and target intermediate results sent by other participating nodes; and
- generating the encryption public key based on respective encryption public key fragments, and generating the evaluation public key based on respective target intermediate results.

3. The method according to claim 2, after generating the evaluation public key, further comprising:
- sending the evaluation public key to the coordination node.

4. The method according to claim 2, wherein generating the private key fragment of the data providing node comprises:
- acquiring key generation parameters, wherein, the key generation parameters comprise a public parameter and a public random number; and
- acquiring the private key fragment based on the public parameter and a private key generation algorithm.

5. The method according to claim 4, wherein generating the encryption public key fragment of the data providing node and the target intermediate result corresponding to the evaluation public key based on the private key fragment comprises:
- generating the encryption public key fragment based on the private key fragment, the public random number and an encryption public key generation algorithm; and
- generating the target intermediate result based on the private key fragment and an evaluation public key generation algorithm.

6. The method according to claim 5, wherein generating the target intermediate result based on the private key fragment and the evaluation public key generation algorithm comprises:
- generating a first intermediate result of the evaluation public key based on the private key fragment, the public random number and the evaluation public key generation algorithm, and broadcasting the first intermediate result;
- receiving respective first intermediate results sent by other data providing nodes;
- acquiring a second intermediate result of the evaluation public key based on the first intermediate result of the evaluation public key and the first intermediate results of other data providing nodes; and
- acquiring the target intermediate result of the evaluation public key based on the private key fragment, the public random number and the second intermediate result, and broadcasting the target intermediate result.

7. An electronic device, comprising a processor and a memory; wherein the processor runs a program corresponding to an executable program code by reading the executable program code stored in the memory to implement the method of claim 1.

8. A computer-readable storage medium with a computer program stored thereon, wherein the program is configured to implement the method of claim 1.

9. A method for processing multi-source data, applicable for a data using node, comprising:
- generating a private key fragment of the data using node, an encryption public key and an evaluation public key, wherein, other participating nodes comprise data providing nodes;
- generating ciphertext data by encrypting local sample data with the encryption public key, and sending the ciphertext data to a coordination node for training a machine learning model;
- receiving ciphertext model parameters corresponding to model parameters of the machine learning model trained by the coordination node, wherein, the ciphertext model parameters are determined by the coordination node based on the evaluation public key and received ciphertext data of the data providing node;
- acquiring a first model parameter fragment by decrypting the ciphertext model parameters with the private key fragment;
- receiving second model parameter fragments sent by other participating nodes; and
- acquiring the machine learning model based on the first model parameter fragment and the second model parameter fragments.

10. The method according to claim 9, wherein generating the private key fragment of the data using node, the encryption public key and the evaluation public key comprises:
- generating the private key fragment of the data using node, and generating an encryption public key fragment of the data using node based on the private key fragment; and
- broadcasting the encryption public key fragment.

11. The method according to claim 10, wherein generating the private key fragment of the data using node comprises:
- acquiring key generation parameters, wherein, the key generation parameters comprise a public parameter and a public random number; and
- acquiring the private key fragment based on the public parameter and a private key generation algorithm.

12. An electronic device, comprising a processor and a memory; wherein the processor runs a program corresponding to an executable program code by reading the executable program code stored in the memory to implement the method of claim 9.

13. A computer-readable storage medium with a computer program stored thereon, wherein the program is configured to implement the method of claim 9.

* * * * *